2,925,349
Patented Feb. 16, 1960

2,925,349
BRIGHT-DRYING POLISH EMULSIONS

Günter Koenig, Guido von Rosenberg, and Wolfgang Sapper, all of Gersthofen, near Augsburg, Germany, assignors to Farbwerke Hoechst Aktiengesellschaft vormals Meister Lucius & Brüning, Frankfurt am Main, Germany, a corporation of Germany No Drawing. Application April 12, 1957
Serial No. 652,365

7 Claims. (Cl. 106—10)

This invention relates to bright-drying polish emulsions.

It is known that aqueous emulsions or dispersions can be prepared from emulsifiable waxes with the use of nonionic emulsifiers. The emulsions or dispersions so obtained may be used for the careful treatment of furniture, leather and various floorcovers, such as linoleum and its substitutes, rubber, asphalt or resinous tiles, parquetted floor, cork, terrazzo and floors made of polyvinyl compounds.

The major part of the emulsifiers or mixtures of emulsifiers used for making these emulsions or dispersions consists of addition products of 15–30 mols (average) of ethylene oxide to either saturated or unsaturated fatty alcohols, for example commercial aliphatic alcohol mixtures containing about 16–20 carbon atoms per molecule, such as commercial oleic alcohol, or to unesterified hydroxyl groups of polyhydric alcohols esterified with fatty acids, such as oleic or lauric acid, i.e. for example sorbitan or glycerol, or to alkyl phenols, such as nonyl phenol. There may be used for example mono-oleates or mono-palmitates of poly-oxyethylene sorbitan. Further emulsifiers which are sometimes used are the reaction products of a number of mols of ethylene oxide with 1 mol of carboxylic acid or an amine. Experience has shown that this type of non-ionic emulsifier has a very good emulsifying effect on ester waxes, and emulsions or dispersions prepared therewith fulfill practically all demanded requirements as to gloss, particle size, stability, film hardness and other important qualitative characteristics.

These non-ionic wax emulsions or dispersions involve however a considerable qualitative disadvantage in that they are too difficult to apply to some floors, i.e. to linoleum covered floors. This drawback requires a wearisome and troublesome treatment of the support. The emulsions or dispersions are sometimes very troublesome to apply in uniform films, for example only after pretreating the support or after repeated to- and fro-movement of the applying rag.

It has been attempted to eliminate this disadvantage with the use of dispersants which, it is true, facilitate the application of the emulsions but, on the other hand, impair the water-proofness of the wax films as a result of an increased re-emulsifiability. The use of a dispersant in bright-drying polish emulsions as a rule reduces the gloss, or the latter becomes mat or even disappears.

These detrimental phenomena are liable to occur with the use of all anion- or cation-active dispersants, i.e. with all aliphatic, alkyl aromatic and aromatic sulfonates and with sulfo-compounds and soaps.

Now, we have found that excellent bright-drying polish emulsions which substantially contain non-ionic emulsifiers are obtained by incorporating in these emulsions additional non-ionic surface active substances which as such are free from a substantial dispersing or emulsifying effect on the ester waxes. The addition of the substances used according to this invention results in the desired improvement of the properties without the disadvantage that involves the use of non-ionic dispersants.

The substances used according to this invention are monohydric aliphatic or cycloaliphatic alcohols or alkyl substituted phenols with a continuous carbon chain of 5 to 14 carbon atoms, or the oxyethylation products thereof with up to 10 mols of ethylene oxide. In the above phenols, the benzene nucleus is calculated with at most 4 carbon atoms. With regard to this definition concerning the benzene nucleus, we refer to U.S. Patent 2,337,190, wherein similar language is employed. In column 2, lines 57–67, it is set forth that cyclic compounds, such as n-butyl benzene and n-amyl benzene, may be defined as hydrocarbons containing six carbon atoms in an open chain for in such compounds two carbon atoms of the cyclic substituent adjacent the alkyl group may function, in effect, as belonging to the alkyl chain.

The compounds used in this invention may consist of either aliphatic oxyethylated or non-oxyethylated alcohols, and of alkyl substituted phenols having short aliphatic side chains carrying substantially 3 to 7 carbon atoms. There may be mentioned by way of example: pentanol, hexanol, heptanol, octanol, nonyl alcohol, decyl alcohol, undecyl alcohol, dodecyl alcohol, quatrodecyl-alcohol and their branched products, such as ethyl hexanol as far as these compounds carry at least 5 carbon atoms in a continuous chain. As cycloaliphatic alcohols there may be mentioned, for example terpene alcohols. Further suitable substances are, for example para-cresol, propyl phenol, butyl phenol, pentyl phenol, hexyl phenol, heptyl phenol, octyl phenol, nonylphenol and the corresponding alkylated cresols, or also the manifold alkylated phenols, such as dibutyl cresol. There may also be used with good success the hydrogenation products of the aforesaid phenols. It is also possible to use the reaction products of the aforesaid aliphatic or cycloaliphatic alcohols or alkyl substituted phenols with 1 to 10 mols of ethylene oxide. Finally, it is possible to use mixtures of the above substances. Particularly useful are substances that consist of oxyethylated alcohol phenols with 3 to 10 carbon atoms in the side chain, as for example ethoxylation products of a tributyl phenol which has been prepared by butylation of phenol with isobutylene. In some cases it is preferred to use aliphatic alcohols with 5 to 14 carbon atoms, or their reaction products with 1 to 5 mols of ethylene oxide.

It is preferred to use per 100 parts by weight of the mixture of emulsifiers and added monohydric alcohol or the oxethylation product thereof, about 5 to 30 parts, generally about 10 to 20 parts of admixed monohydric alcohol or the oxethylation product thereof, and about 8 to 20 parts, preferably 12 to 18 parts of the mixture of emulsifier and admixed monohydric alcohol or the oxethylation product thereof per 100 parts of wax.

The waxes used are chiefly ester waxes or mixtures thereof such as carnauba wax or esterification products of oxidation products of montan wax, for example chromic acid oxidation products, in which the acid proportions are esterified with one or more monohydric or polyhydric alcohols. As such alcohols there may be used more especially: ethylene glycol, diethylene glycol, glycerol, 1.3-propylene glycol, 1.4-butylene glycol, 1.3-butylene glycol or aliphatic glycols with 3 to 6 carbon atoms, and 2.3- or 4 hydroxyl groups, for example dihexane diol, trimethylol propane, or pentaerythrite. There may also be used monohydric alcohols containing 16 to 30 carbon atoms, for example cetyl alcohol, stearyl alcohol, oleic alcohol, behenic alcohol, or cerylic alcohol. If desired, there may also be used crude montan wax provided that the separation of dark sediments which frequently occurs upon storage of these emulsions is immaterial.

The substances according to this invention may be used for emulsification of waxes in a common melt together with the oxyethylated hydroxyl compounds described above which bring about emulsification. If the water-solubility is sufficiently high, it is also possible subsequently to incorporate these substances in the form of aqueous solutions in the aforesaid finished wax emulsions. In both cases emulsions are obtained which are easy to apply to the most various supports, and which spread and dry uniformly to form wax films of which the waterproofness is not impaired. In bright drying polish emulsions the gloss is absolutely clear and therefore shows an especially full and deep appearance.

In addition to waxes and the mixture of emulsifier and admixed material the emulsions or dispersions may also contain the usual additions, such as resinous substances free from ester groups, or dyestuffs, pigments, resins, insecticidal and bactericidal agents, or silicones; there may also be incorporated in the emulsions or dispersions of the invention small amounts of solvents, for example 2 to 3% of methanol, calculated upon the emulsion, to increase the frost resistance, provided that such solvents do not impair the gloss.

The bright drying polish emulsions of the present invention offer the advantage that they can more readily be applied and that they spread and dry more uniformly and with a clearer gloss as compared with the known emulsions.

The following examples serve to illustrate the invention, but they are not intended to limit it thereto:

*Example 1*

8.8 parts of the oxyethylation product from commercial oleic alcohol with about 20 mols of ethylene oxide are melted together at 80° C. with 1.2 parts of a commercial alcohol fraction oxyethylated with 5 mols of ethylene oxide and containing substantially alcohols with 7 to 9 carbon atoms. The mixture obtained is allowed to solidify and 1.5 parts are dissolved in 10 parts of a molten emulsifiable ester wax having a melting point of 80-83° C. and a saponification number of 130 to 145. 11.5 parts of this mixture and 88.5 parts of hot water are treated in the usual manner to give a wax dispersion which as compared with an emulsion prepared without such addition can more easily be applied and spreads and dries more uniformly with a clear gloss.

*Example 2*

9 parts of the oxyethylation product of commercial oleic alcohol with about 20 mols of ethylene oxide are melted together at 80° C. with 1 part of a tributyl phenol oxyethylated with 7 mols of ethylene oxide and prepared by butylating phenol with iso-butylene. The mixture obtained is allowed to solidify and then worked up in known manner, for example as described in Example 1, to obtain wax emulsions or dispersions that possess the advantages described above.

*Example 3*

10 parts of an emulsifiable ester wax (melting point: 78-82° C.; saponification number: 150-170) are melted at 100° C. with 1.5 parts of the oxyethylation product of commercial nonyl phenol with about 20 mols of ethylene oxide and 0.5 part of an unoxyethylated commercial alcohol mixture which contains substantially alcohols with 7 to 9 carbon atoms. The mixture obtained is then emulsified in the usual manner with the use of 88 parts of hot water to yield an emulsion that possesses the advantages described above.

*Example 4*

10 parts of an emulsifiable ester wax (melting point: 83-85° C.; saponification number: 72-81) are melted at 100° C. with 1.6 parts of a commercial sorbitan monooleate ethoxylated with 15-20 mols of ethylene oxide. The mixture obtained is then emulsified in the usual manner with the use of 88.4 parts of water. The resulting emulsion cooled to room temperature is then stirred with 4 parts of a 4% aqueous solution (likewise cooled to room temperature) of a tributyl phenol oxyethylated with 7 mols of ethylene oxide. The final mixture obtained offers the advantages described in Example 1, as compared with the undiluted basic wax emulsion.

*Example 5*

7 parts of the oxyethylation product of oleic alcohol with about 18 mols of ethylene oxide are melted at 85° C. with 3 parts of a tributyl phenol oxyethylated with 9 mols of ethylene oxide and obtained by butylating phenol with isobutylene. The mixture obtained is used for the preparation of wax emulsions or dispersions (as described in Example 1) which possess the advantages described above.

We claim:

1. Bright-drying polish emulsions consisting essentially of a substantially aqueous emulsion of at least one ester wax, a nonionic emulsifier being per se substantially suitable for emulsifying ester waxes, said emulsifier being obtained by adding about 15-30 mols of ethylene oxide to a compound selected from the group consisting of aliphatic alcohols of at least 16 carbon atoms, esterification products of polyhydric alcohols and fatty acids which still contain unesterified hydroxyl groups, alkyl phenols, carboxylic acids, and amines, and a monohydric alcohol having 5 to 14 carbon atoms in a continuous chain, said alcohol being as such substantially unsuitable for emulsifying said ester waxes and being selected from the group consisting of aliphatic alcohols, cycloaliphatic alcohols, alkyl-substituted phenols, reaction products thereof with 1 to 10 mols of ethylene oxide and mixtures thereof, 5 to 30 parts of said monohydric alcohols being contained in 100 parts of the mixture of the nonionic emulsifiers and said monohydric alcohols.

2. Bright-drying polish emulsions consisting essentially of a substantially aqueous emulsion of at least one ester wax, a nonionic emulsifier being per se substantially suitable for emulsifying ester waxes and a monohydric alcohol having 5 to 14 carbon atoms in a continuous chain, said alcohol being as such substantially unsuitable for emulsifying said ester waxes and being selected from the group consisting of aliphatic alcohols, cycloaliphatic alcohols, alkyl-substituted phenols, reaction products thereof with 1 to 10 mols of ethylene oxide and mixtures thereof, 8 to 20 parts—calculated on 100 parts of ester wax—of the total amount of the nonionic emulsifiers and said monohydric alcohols being contained in the emulsion, and 5 to 30 parts of said monohydric alcohols being contained in 100 parts of the total amount of the nonionic emulsifiers and said monohydric alcohols.

3. Bright-drying polish emulsions according to claim 1, which contain as ester wax an esterification product of oxidized montan wax.

4. Bright-drying polish emulsions according to claim 1, which contain carnauba wax as ester wax.

5. Bright drying polish emulsions consisting essentially of a substantially aqueous emulsion of at least one ester wax, a nonionic emulsifier being as such substantially suitable for emulsifying ester waxes, and a reaction product of 1 to 10 mols of ethylene oxide with a monohydric alkyl phenol having 5 to 14 carbon atoms in a continuous chain and containing at least one side chain of 3 to 10 carbon atoms, said reaction product of the alkyl phenol being as such substantially unsuitable for emulsifying ester waxes being present in an amount of 5 to 30 parts in 100 parts of the mixture of the nonionic emulsifier and said reaction product of the alkyl phenol.

6. Bright drying polish emulsions consisting essentially of a substantially aqueous emulsion of at least one ester wax, a nonionic emulsifier being as such substantially suitable for emulsifying ester waxes, and a reaction product of 1 to 10 mols of ethylene oxide with a monohydric alkyl phenol having 5 to 14 carbon atoms in a continuous chain and at least one side chain of an alkyl group of 3 to 7 carbon atoms in a continuous chain, said reaction product of the alkyl phenol being as such substantially unsuitable for emulsifying ester waxes being present in an amount of 5 to 30 parts in 100 parts of the mixture of the nonionic emulsifier and said reaction product of the alkyl phenol.

7. Bright drying polish emulsions consisting essentially of a substantially aqueous emulsion of at least one ester wax, a nonionic emulsifier being as such substantially suitable for emulsifying ester waxes, and a monohydric aliphatic alcohol of 5 to 14 carbon atoms in a continuous chain wherein the hydroxyl group of the alcohol is reacted with 0 to 5 mols of ethylene oxide, each aliphatic alcohol and the reaction product thereof being as such substantially unsuitable for emulsifying ester waxes, 5 to 30 parts of said monohydric aliphatic alcohol and the reaction product thereof being contained in 100 parts of the mixture of the nonionic emulsifier and said monohydric alcohols and their reaction products.

References Cited in the file of this patent
FOREIGN PATENTS 760,479    Great Britain _____ Oct. 31, 1956

OTHER REFERENCES

Surface Active Agents, Interscience Publishers, Inc., New York, 1949, pages 202–205.